US009531267B2

(12) United States Patent
Fan (10) Patent No.: US 9,531,267 B2
(45) Date of Patent: Dec. 27, 2016

(54) DC-DC CONVERTER USING INTERNAL RIPPLE WITH THE DCM FUNCTION

(71) Applicant: Texas Instruments Incorporated, Dallas, TX (US)

(72) Inventor: Jiwei Fan, Cary, NC (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 112 days.

(21) Appl. No.: 14/517,003

(22) Filed: Oct. 17, 2014

(65) Prior Publication Data

US 2015/0102794 A1 Apr. 16, 2015

Related U.S. Application Data

(62) Division of application No. 13/171,283, filed on Jun. 28, 2011, now Pat. No. 8,896,284.

(51) Int. Cl.
| | | |
|---|---|---|
| *G05F 1/00* | (2006.01) | |
| *H02M 3/156* | (2006.01) | |
| *H02M 3/158* | (2006.01) | |
| *H02M 1/00* | (2006.01) | |

(52) U.S. Cl.
CPC ........... *H02M 3/156* (2013.01); *H02M 3/1563* (2013.01); *H02M 3/1588* (2013.01); *H02M 2001/0003* (2013.01); *H02M 2001/0025* (2013.01); *Y02B 70/1466* (2013.01)

(58) Field of Classification Search
CPC ... H02M 3/156; H02M 3/157; H03L 2207/06; H03L 7/235; H03L 7/16; G05B 2219/34001; G05B 2219/41461

USPC ....... 323/222, 223, 225, 271, 282, 284, 351; 327/147, 156
See application file for complete search history.

(56) References Cited

U.S. PATENT DOCUMENTS

| | | | |
|---|---|---|---|
| 5,600,272 A | * | 2/1997 | Rogers .................. H03L 7/0891 327/103 |
| 5,726,563 A | | 3/1998 | Bolton, Jr. |
| 5,838,151 A | | 11/1998 | Myers et al. |
| 5,994,885 A | | 11/1999 | Wilcox et al. |
| 6,396,250 B1 | | 5/2002 | Bridge |
| 6,396,890 B1 | * | 5/2002 | Turner .................... H03L 7/146 327/156 |
| 6,606,365 B1 | | 8/2003 | Chen |
| 6,879,136 B1 | | 4/2005 | Erisman et al. |
| 6,933,706 B2 | | 8/2005 | Shih |
| 6,984,966 B2 | | 1/2006 | Kubota et al. |
| 7,109,693 B2 | | 9/2006 | Yoshida et al. |
| 7,358,710 B2 | | 4/2008 | Luo et al. |
| 7,759,912 B2 | | 7/2010 | Weng et al. |

(Continued)

OTHER PUBLICATIONS

Fan, et al. "A Monolithic Buck Converter Using Differentially Enhanced Duty Ripple Control," IEEE Custom Integrated Circuits Conference (CICC), 2009, pp. 527-530.

(Continued)

*Primary Examiner* — Adolf Berhane
*Assistant Examiner* — Alex Torres-Rivera
(74) *Attorney, Agent, or Firm* — William B. Kempler; Chares A. Brill; Frank D. Cimino (57) ABSTRACT

A DC-DC converter, having an input voltage and an output voltage, includes an inductor and a switch switching the input voltage to an input side of the inductor, where a feedback path controlling initiation of closing the switch includes capacitive coupling of the voltage at the input side of the inductor.

1 Claim, 5 Drawing Sheets

(56) References Cited

U.S. PATENT DOCUMENTS

| | | |
|---|---|---|
| 7,888,925 B2 | 2/2011 | Dequina |
| 8,405,369 B1 | 3/2013 | Kahn |
| 8,896,284 B2 | 11/2014 | Fan |
| 2004/0090273 A1* | 5/2004 | Chang .................. H03K 23/667 331/16 |
| 2008/0309302 A1 | 12/2008 | Chen et al. |
| 2009/0284235 A1 | 11/2009 | Weng et al. |
| 2012/0112721 A1* | 5/2012 | Wu ....................... H02M 3/156 323/288 |

OTHER PUBLICATIONS

Fan, et al. "Design and Characterization of Differentially Enhanced Duty Ripple Control (DE-DRC) for Step-Down converter," IEEE Transactions on Power Electronics, vol. 24, No. 12, Dec. 2009, pp. 2714-2725.

\* cited by examiner

*FIG. 7*

DC-DC CONVERTER USING INTERNAL RIPPLE WITH THE DCM FUNCTION

CROSS-REFERENCE TO RELATED APPLICATIONS

This application is a divisional of U.S. patent application Ser. No. 13/171,283, filed on Jun. 28, 2011 (Now U.S. Pat. No. 8,896,284), and is incorporated herein by reference.

BACKGROUND

A DC-DC converter is an electronic circuit that converts a source of direct current (DC) from one voltage to another. For example, DC-DC converters are widely used in portable devices to provide power from a battery. DC-DC converters may also regulate the output voltage, compensating for varying load current and variations in the input voltage.

Figure 1:
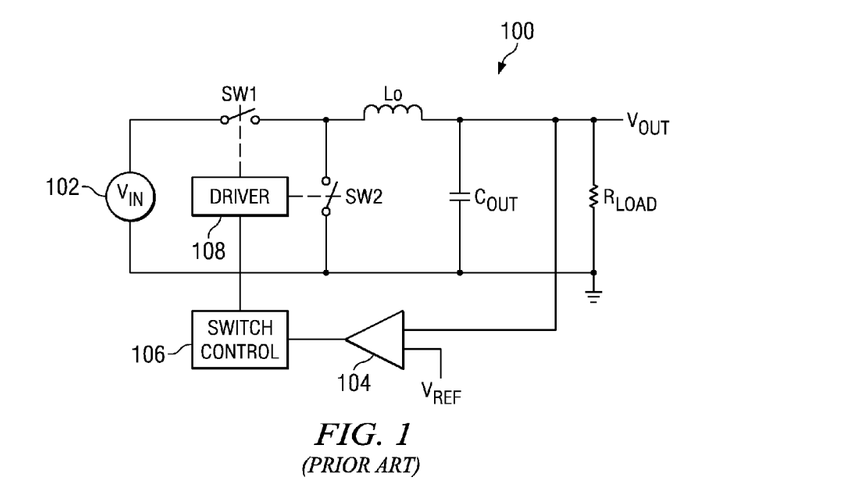
FIG. 1 is a block diagram illustrating an example prior art embodiment of a DC-DC converter.

FIG. 1 illustrates one common type of DC-DC converter. The DC-DC converter circuit 100 in FIG. 1 (simplified to facilitate illustration and description) is a switching step-down converter (the input voltage is higher than the output voltage), and the basic design is called a Buck converter. In FIG. 1, a power source 102 provides direct current at an input voltage $V_{IN}$. The circuit 100 provides direct current to a load ($R_{LOAD}$) at an output voltage $V_{OUT}$. Two electronic switches (SW1, SW2) are controlled by a switch control circuit 106 and driver 108. At most only one switch is closed at any one time. When SW1 is closed, current flows into $R_{LOAD}$ and a filter capacitor ($C_{OUT}$) from the source 102, and $V_{OUT}$ rises linearly. In addition, when SW1 is closed, energy is stored in $L_O$ and $C_{OUT}$. When SW2 is closed, current flows from stored energy in $C_{OUT}$ and from stored energy in $L_O$, and $V_{OUT}$ decreases linearly. A comparator 104 compares $V_{OUT}$ to a reference voltage $V_{REF}$, and the switch control circuit 106 adjusts the closing frequency or duty cycle of SW1 in response to the output of comparator 104.

There are many variations in topology and control of DC-DC converters. The circuit illustrated in FIG. 1 uses output voltage feedback. Some circuits use current feedback. Some circuits have multiple feedback loops. In general, there are advantages and disadvantages of each variation, and some applications have special requirements. In particular, power supplies for advanced digital circuits have a challenging set of requirements. Microprocessor cores, digital signal processors, and other devices may switch rapidly from sleep-mode to full-power and full-power back to sleep-mode, requiring a fast response by the power supply to sudden load changes. In addition, such electronic devices have strict limits on the peak-peak transient output voltage change that is allowed during the response to a load transient. In addition, power supplies for advanced digital circuits need to accommodate a wide range of input voltages and output voltages, need to provide power at low output voltages (for example, 1V), and need to be robust to electronic system noise, particularly ground noise.

Figure 2:
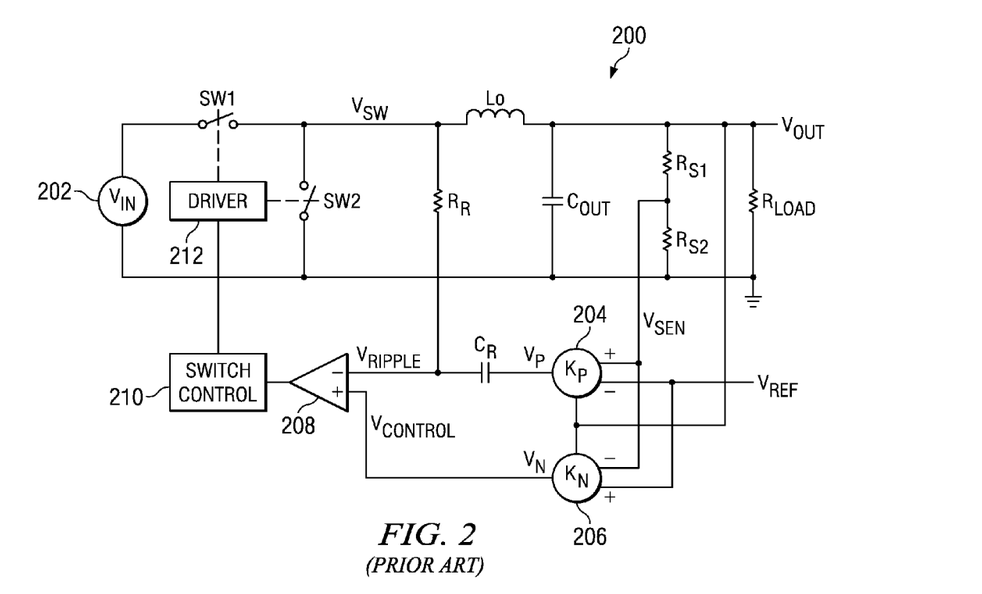
FIG. 2 is a block diagram illustrating an example of an improved prior art embodiment of a DC-DC converter.

FIG. 2 illustrates an example DC-DC converter 200 based on a step-down switching circuit as in FIG. 1, with enhancements that are particularly suitable for meeting many of the general goals for supplying power to advanced digital circuits. Circuit 200 in FIG. 2 (simplified to facilitate illustration and discussion) is called a DE-DRC (Differentially Enhanced-Duty Ripple Control) circuit. The DE-DRC design has been previously published by the present inventor and others. See, for example, J. Fan, X. Li, S. Lim, and A. Huang, "Design and Characterization of Differentially Enhanced Duty Ripple Control (DE-DRC) for Step-Down Converter," *IEEE Trans. Power Electron.*, vol. 24, no. 12, pp 2714-2725, December 2009. In FIG. 2, a power source 202 provides direct current at an input voltage $V_{IN}$.

The circuit 200 provides direct current to a load ($R_{LOAD}$) at an output voltage $V_{OUT}$. Two electronic switches (SW1, SW2) are controlled by a switch control circuit 210 and driver 212. At most only one switch is closed at any one time. A comparator 208 controls the switch control circuit 210. There are two feedback paths. In a first feedback path, the voltage $V_{SW}$ on the switched side of the inductor $L_O$ is coupled to the comparator 208 through a low pass filter ($R_R$, $C_R$). In a second feedback path, two differential difference amplifiers (204, 206) generate a differential pair of feedback signals, $V_P$ and $V_N$. These two differential signals are coupled to comparator 208, where $V_N$ is directly coupled, and $V_P$ is coupled through a high pass filter ($C_R$, $R_R$).

$V_P$ and $V_N$ are as follows:

$V_P = K_P(HV_{OUT} - V_{REF}) + V_{OUT}$ $V_N = -K_N(HV_{OUT} - V_{REF}) + V_{OUT}$

Where $H = R_{S2}/(R_{S1} + R_{S2})$, $K_P$=gain of positive differential circuit 204, and $K_N$=gain of negative differential circuit 206, and $V_{REF}$ is a constant reference voltage.

The first feedback path coupling $V_{SW}$ to the comparator 208 is fast because there are only passive components between $V_{SW}$ and the comparator. The feedback path coupling $V_{OUT}$ to the comparator 208 is slower, because $V_{OUT}$ is proportional to the integral of current in $C_{OUT}$, and there are active amplifiers between $V_{OUT}$ and the comparator. The second loop can adjust the control bandwidth. Both loops have a big influence on the transient response. The two feedback loops combined provide a stable system with high bandwidth control.

To simplify the discussion, assume H=1 and $V_{IN}$ is constant. First, consider the steady state (constant load). In the steady state, with H=1, $V_{CONTROL}$ (the positive input of the comparator 208) is approximately $V_{OUT}$. $V_{SW}$ is a square wave, having an average value of approximately $V_{OUT}$, and low-pass filtered $V_{SW}$ contributes a sawtooth waveform having an average value of approximately the average value of $V_{SW}$ to $V_{RIPPLE}$ (the negative input of the comparator 208). When $V_{RIPPLE}$ drops below $V_{CONTROL}$, comparator 208 causes switch control circuit 210 to close SW1 for a constant on-time. $V_{SW}$ is driven higher while SW1 is closed, and $V_{OUT}$ is controlled to be approximately equal to the average value of $V_{SW}$. If the load current increases, the average value of $V_{SW}$ increases rapidly (because of increasing current through $L_O$), $V_P$ has a transient decrease ($V_{OUT}$ decreases due to an increased current draw from $C_{OUT}$), $V_N$ has a transient increase, and the duty cycle of SW1 is increased (switching frequency increases). If the load current decreases, the average value of $V_{SW}$ rapidly decreases, $V_P$ has a transient increase, $V_N$ has a transient decrease, and the duty cycle of SW1 is decreased. The magnitude of $V_{RIPPLE}$ at the negative input of the comparator 208 is relatively large compared to the ripple voltage on $V_{OUT}$, which provides good noise immunity in the feedback signal. In addition, the circuit provides a fast response to load transients over a wide input and output range.

Even though the DE-DRC circuit of FIG. 2 is particularly suitable for providing power to advanced digital systems, there is an ongoing need for further improvements in efficiency, noise immunity, output accuracy, output range, and so forth, for DC-DC converters.

DETAILED DESCRIPTION

Figure 3:
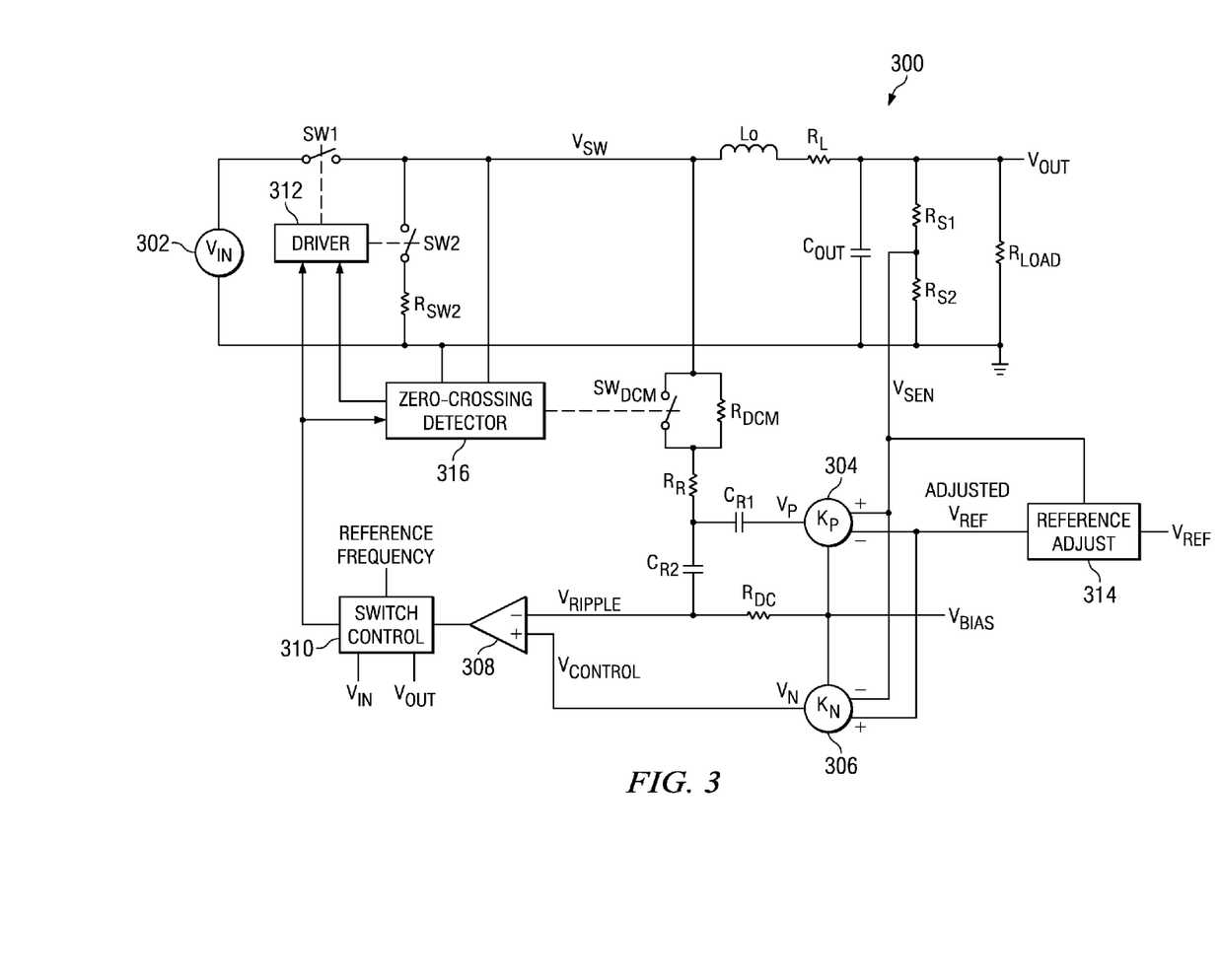
FIG. 3 is a block diagram illustrating an example embodiment of a DC-DC converter with further improvements.

FIG. 3 illustrates an example embodiment of a DC-DC converter 300 based on the DE-DRC circuit of FIG. 2, but with further enhancements. In FIG. 3, a power source 302 provides direct current at an input voltage $V_{IN}$. The circuit 300 (simplified to facilitate illustration and discussion) provides direct current to a load (Rump) at an output voltage $V_{OUT}$. Two electronic switches (SW1, SW2) are controlled by a switch control circuit 310 and driver 312. At most only one switch is closed at any one time. A comparator 308 controls switch control circuit 310.

In the circuit in FIG. 3, there are three feedback paths. In a first feedback path, the voltage $V_{SW}$ on the switched side of the inductor $L_O$ is AC coupled to the comparator 308. In a second feedback path, two differential difference amplifiers (304, 306) generate a differential pair of feedback signals, $V_P$ and $V_N$. These two differential signals are coupled to comparator 308, where $V_N$ is directly coupled, and $V_P$ is coupled through a high pass filter network ($C_{R1}$, $R_R$) ($C_{R2}$, $R_{DC}$). In a third feedback loop, the reference voltage is adjusted by a reference adjust circuit 314.

$V_P$ and $V_N$ are as follows:

$$V_P = K_P(HV_{OUT} - V_{REF}\text{ adjusted}) + V_{BIAS}$$

$$V_N = -K_N(HV_{OUT} - V_{REF}\text{ adjusted}) + V_{BIAS}$$

Where $H = R_{S2}/(R_{S1}+R_{S2})$, $K_P$=gain of positive differential circuit 304, and $K_N$=gain of negative differential circuit 606, $V_{REF}$ adjusted is a variable reference voltage, and $V_{BIAS}$ is a fixed reference voltage.

The first feedback path coupling $V_{SW}$ to the comparator 308 is fast, because $V_{RIPPLE}$ is proportional to AC current in inductor $L_O$, and there are only passive components between $V_{SW}$ and the comparator. The feedback path coupling $V_{OUT}$ to the comparator 308 is slower, because $V_{OUT}$ change is proportional to the integral of AC current in $C_{OUT}$, and there are active amplifiers between $V_{OUT}$ and the comparator. The feedback path adjusting $V_{REF}$ is intentionally very slow to avoid interference with the first two feedback paths. The third feedback path provides better output voltage accuracy. The three feedback paths combined provide a stable system with high bandwidth control and accurate output voltage.

Comparing the circuit 300 of FIG. 3 to the circuit 200 of FIG. 2, and comparing the equations for $V_P$ and $V_N$ for circuit 300 to the equations for $V_P$ and $V_N$ for the circuit 200, note the following differences (each of which will be discussed in more detail further below):

1. A zero-crossing detector 316 and switch $SW_{DCM}$ prevent inductor current from reversing, which improves the efficiency at light loads.

2. $V_{SW}$ is AC coupled ($C_{R2}$) to the comparator 308, which eliminates a small DC voltage drop with increasing load current.

3. The differential difference amplifier inputs are referenced to a fixed bias voltage $V_{BIAS}$ instead of $V_{OUT}$, which enables $V_{OUT}$ to be greater than the supply voltage of the amplifiers.

4. A third feedback loop uses a reference adjust circuit 314 to adjust the voltage reference, which eliminates a small DC voltage offset in $V_{OUT}$.

5. The switch control circuit 310 uses a reference frequency and phase-locked-loop to lock the steady-state switching frequency for most of the range of output loads, which facilitates the selection of $L_O$ and $C_{OUT}$, and facilitates design of electronic interference control in external circuitry.

When SW1 is closed, $V_{SW}$ is approximately $V_{IN}$. When SW2 is closed, $V_{SW}$ is approximately ground. The on-time of SW1 is adjusted to keep the steady-state average value of $V_{SW}$ approximately equal to $V_{OUT}$. SW2 has a small but finite on-resistance depicted by $R_{SW2}$ in FIG. 3. When SW2 is closed, $V_{SW}$=ground$-I_{LOAD}*R_{SW2}$, so $V_{SW}$ is slightly below ground when SW2 is closed. In a light load condition, the energy stored in $L_O$ may be exhausted before the end of the switching cycle, the current in $L_O$ may reverse and start increasing in the opposite direction (current reverses, flowing out of $C_{OUT}$ through $L_O$ into ground) and $V_{SW}$ will then be positive. If current in $L_O$ reverses, energy is wasted, and converter efficiency is reduced. This is called Discontinuous Conduction Mode (DCM). In the converter illustrated in FIG. 3, the circuit 300 uses a zero-crossing detector 316 to detect DCM. If DCM is detected, SW2 is opened to block reverse current flow. In addition, if DCM is detected, a switch $SW_{DCM}$ is opened, placing $R_{DCM}$ in the path coupling $V_{SW}$ to the negative input of the comparator 308 ($V_{RIPPLE}$), resulting in a decreased duty cycle for SW1. The zero-crossing detector 316 compares $V_{SW}$ to zero. If $V_{SW}$ is greater than or equal to zero while SW2 is closed, the zero-crossing detector 316 will cause the driver 312 to open SW2 (tri-state the power stage) to prevent reverse current flow. In addition, if $V_{SW}$ is greater than or equal to zero while SW2 is closed, the zero-crossing detector 316 opens $SW_{DCM}$. $R_{DCM}$ is large compared to $R_R$, so with $SW_{DCM}$ open, the $V_{SW}$ signal contribution to $V_{RIPPLE}$ is greatly reduced and initiation of an on-pulse for SW1 is delayed. Note, the $V_{SW}$ input to the zero crossing detector may be resistively scaled (not illustrated).

With ideal components, in the steady state, $V_{SW}$ would have an average value of exactly $V_{OUT}$. Real non-ideal inductors have some inherent DC resistance, plus there are finite resistances in the mounting connections (for example, solder bumps) and in the connecting traces. In FIG. 3, $R_L$ depicts the effective DC resistance of $L_O$. As a result, the average (DC) value for $V_{SW}$ is as follows:

$$DC\ V_{SW} = DC\ V_{OUT} + (DC\text{ load current})*R_L$$

Accordingly, with real non-ideal components, the DC value of $V_{SW}$ is slightly greater than DC $V_{OUT}$, and the difference increases with increasing load current. As discussed above, advanced digital circuits have strict specifications for power. One common approach to dealing with output voltage changing with load current is to set the output voltage of the power supply to the highest level allowed in the specification window at no-load, and allow the output voltage to droop to the lowest level allowed in the specification at full-load. In the converter illustrated in FIG. 3, the DC value of low-pass-filtered $V_{SW}$ is blocked from the feedback loop, and only the magnitude and phase of the AC portion of low-pass-filtered $V_{SW}$ are coupled to the negative input to the comparator 308 ($V_{RIPPLE}$). There is no increase in $V_{RIPPLE}$ as a function of load current. As a result, the DC-DC converter circuit illustrated in FIG. 3 eliminates the issue of output voltage changing with load current. Note that transient load changes will result in transient changes to $V_{SW}$, which in turn will be AC coupled to the negative input to the comparator 308.

In the prior art circuit illustrated in FIG. 2, comparator 208 triggers the initiation of an on-pulse for SW1. Initiation of the next on-pulse depends on comparison of $V_N$ to $V_{BIAS}$ plus $V_{RIPPLE}$ by the comparator 208. In the steady state, switch control 310 closes SW1 at a constant frequency. In the circuit illustrated in FIG. 2, on-time is adjusted to keep the switching frequency constant over a wide range of input and output voltages. However, the switching frequency changes slightly with load current. Power supply designers choose $L_O$ and $C_{OUT}$ based on the switching frequency. In addition, design for Electromagnetic Compatibility (EMC) for the power supply within a larger system depends on the switching frequency of the power supply. Accordingly, system designers prefer the power supply switching frequency to be as constant as possible.

Figure 4:
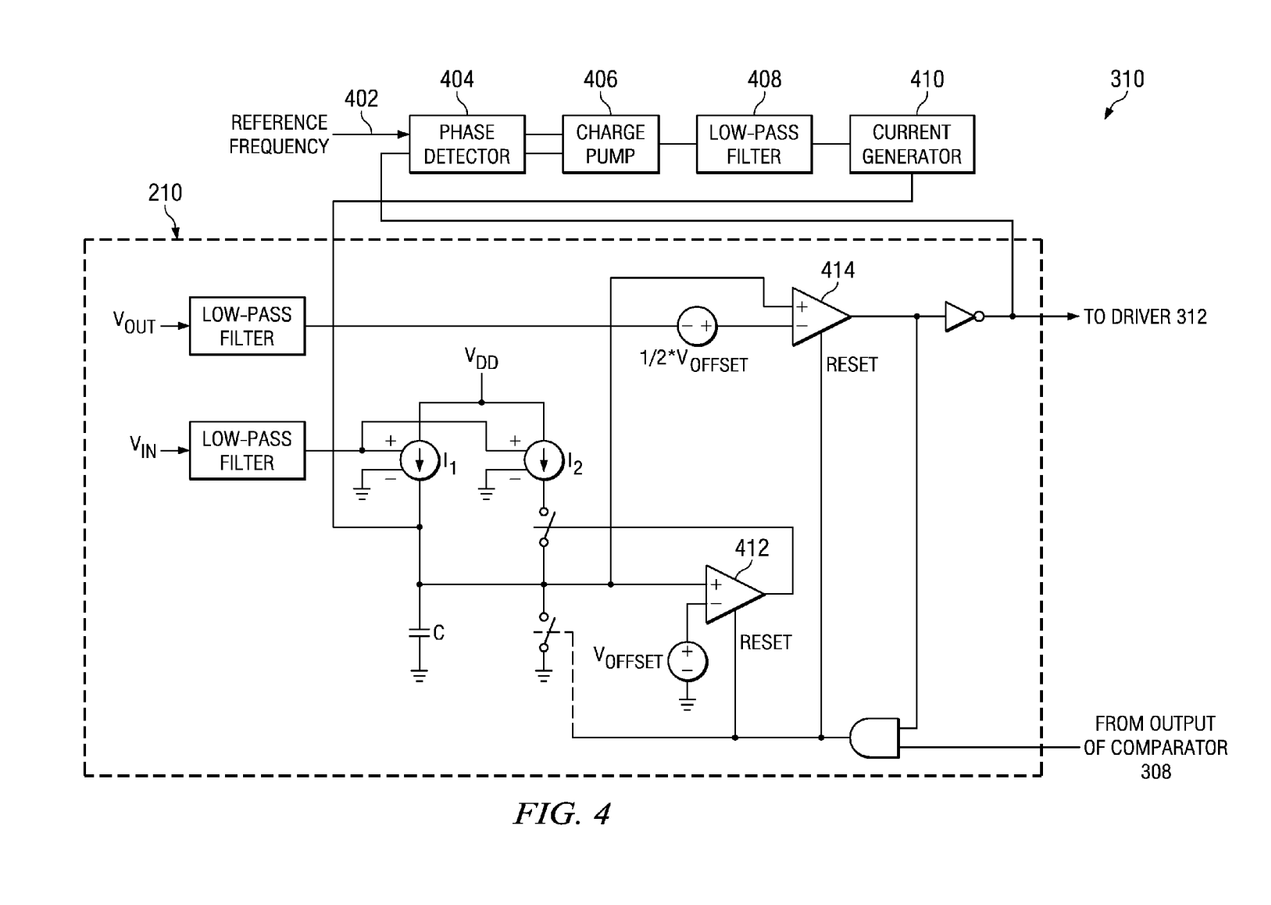
FIG. 4 is a block diagram illustrating additional detail for an example embodiment of part of the DC-DC converter of FIG. 3.

FIG. 4 illustrates additional detail for the switch control circuit 310 in FIG. 3. Switch control circuit 310 provides a locked (constant) switching frequency in the steady state, regardless of load current. However, the frequency locking is overridden during transient events to help regulation, and the frequency locking is overridden to improve efficiency if DCM is detected. Circuit 310 in FIG. 4 adds additional circuitry to circuit 210 of FIG. 2. That is, the circuitry in the dashed box labeled 210 in FIG. 4 is essentially the same as switch circuit 210 in FIG. 2, except for signal lines going to and from additional elements to form a frequency locked loop. In circuit 210, the on-pulse width varies with $V_{IN}$ and $V_{OUT}$ to keep the switching frequency constant with different input and output voltages. Note, the $V_{IN}$ and $V_{OUT}$ inputs to the switch control circuit 310 may be resistively scaled (not illustrated). I1 and I2 are voltage controlled current sources controlled by $V_{IN}$. Current charges a capacitor C resulting in a linear voltage ramp. Capacitor C is discharged when comparator 308 initiates an on-pulse. The on-pulse ends when the voltage ramp on C exceeds $V_{OUT}$ plus an offset (comparator 414). The use of two comparators (412, 414) provides cancellation of some internal delays and offsets. In circuit 210, given a constant $V_{OUT}$ and $V_{IN}$, the on-pulse width is fixed, and a switching cycle ends when a new pulse is triggered by the main comparator (FIG. 2, 208; FIG. 3, 308). In circuit 310, a phase detector 404 receives a reference frequency 402, and elements 404, 406, 408, 410 in conjunction with circuit 210 form a frequency-locked loop. Current generator 410 adds to the current generated by I1, causing the resulting steady-state pulse-width to vary with different loads to maintain a constant switching frequency with different loads. A pulse is still triggered by the main comparator 308, so comparator 308 can cause a pulse to be generated early, or delay the generation of a pulse, so the frequency is not locked during transient conditions or in case of DCM.

Figure 5:
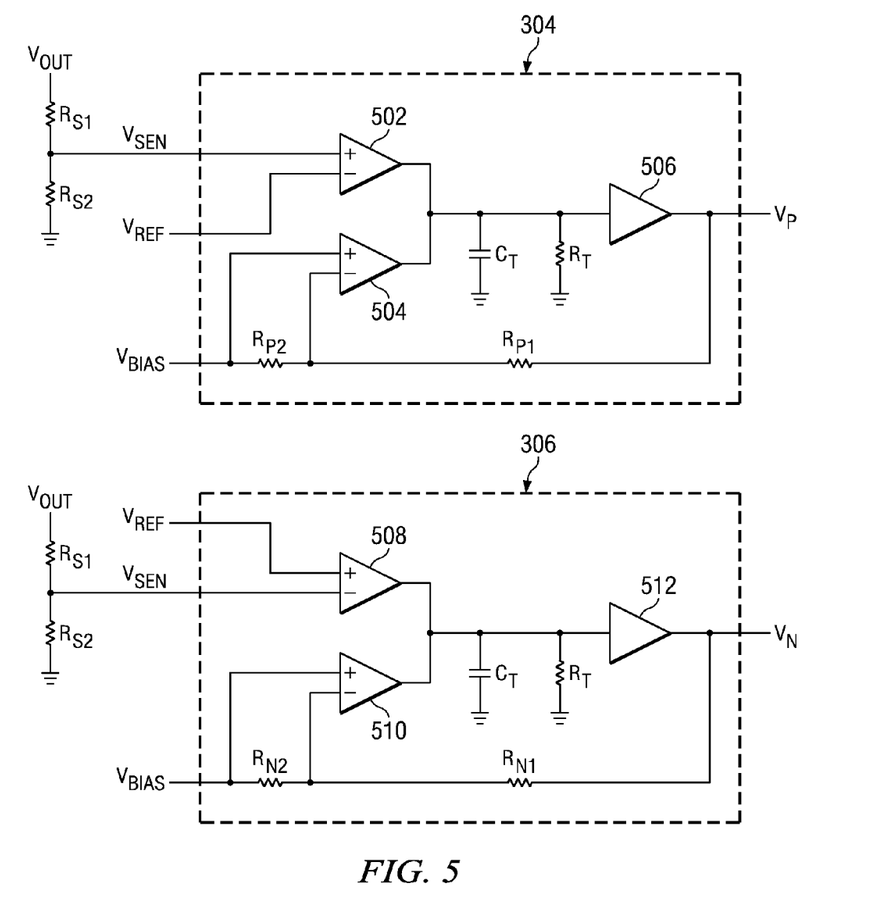
FIG. 5 is a block diagram illustrating additional detail for an example embodiment of part of the DC-DC converter of FIG. 3.

FIG. 5 illustrates additional detail for the differential difference amplifiers 304 and 306 in FIG. 3. Each differential difference amplifier receives two pairs of differential input voltages. Each differential difference amplifier has two identical trans-conductance blocks (502, 504) (508, 510), which can generate two currents from the two differential input voltages with the same trans-conductance. These currents are added together at the input of a voltage buffer (506, 512). $C_T$ and $R_T$ represent parasitic capacitance and finite resistance. The gains are set by feedback resistors, as follows:

$$K_P = (R_{P1} + R_{P2})/R_{P2}$$

$$K_N = (R_{N1} + R_{N2})/R_{N2}$$

Figure 6:
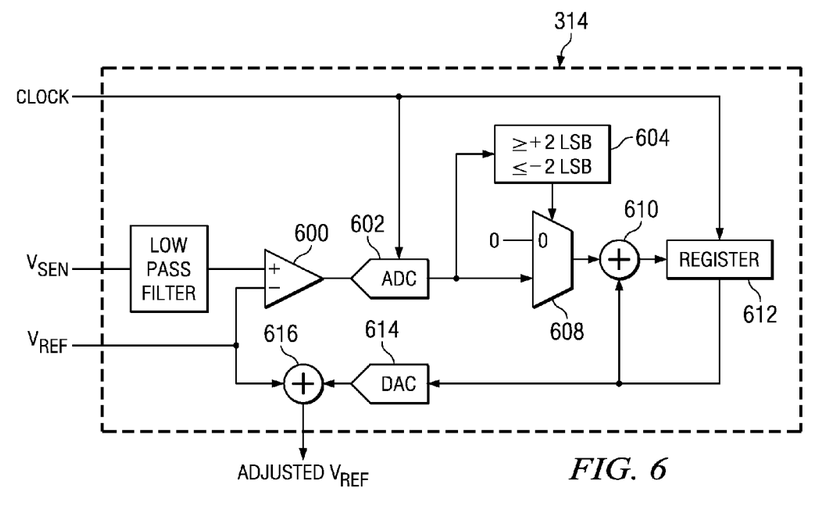
FIG. 6 is a block diagram illustrating additional detail for an example embodiment of part of the DC-DC converter of FIG. 3.

For the prior art circuit in FIG. 2, there is an inherent slight offset between $V_{SEN}$ ($V_{SEN} = H^* V_{OUT}$) and $V_{REF}$, which is on the order of about 10-20 mV. The circuit in FIG. 3 eliminates that offset by adjusting the voltage reference. FIG. 6 illustrates additional detail for the reference adjust circuit 314 in FIG. 3. Adjusted $V_{REF}$ is $V_{REF}$ plus the integral of ($V_{SEN} - V_{REF}$). Integration may be implemented as an analog operational amplifier circuit. However, for implementation as part of an integrated circuit, an analog integrator needs an external capacitor and an additional pin for connecting to the external capacitor, or a large capacitor must be fabricated as part of the integrated circuit. Accordingly, for implementation as part of an integrated circuit, it may be preferable to use a digital circuit to mimic the function of an analog integrator. The circuit in FIG. 6 illustrates an example digital implementation. In FIG. 6, the analog difference between $V_{SEN}$ and $V_{REF}$ is determined by an analog preamplifier 600 (which may have a gain other than one). The output of the preamplifier 600 is digitized by an analog-to-digital converter (ADC) 602. Small differences are ignored to prevent chatter on adjusted $V_{REF}$. As an example, a threshold circuit 604 determines whether the magnitude of the digital output of ADC 602 is greater than or equal to two least-significant-bits. If the magnitude is greater than two least-significant-bits, a multiplexer 608 sends the digital output of ADC 608 to a digital adder 610. Otherwise, a digital value of zero is sent to the digital adder and adjusted $V_{REF}$ does not change. A register 612 holds the digital integrated difference value. The digital value of the register 612 is added to the digital output of the multiplexer 608 by the digital adder 610 and the result is stored in the register 612. The digital value of the register 612 is converted to an analog voltage by a digital-to-analog converter (DAC) 614. An analog summing junction 616 then adds $V_{REF}$ to the analog output of DAC 614 to generate adjusted $V_{REF}$.

Figure 7:
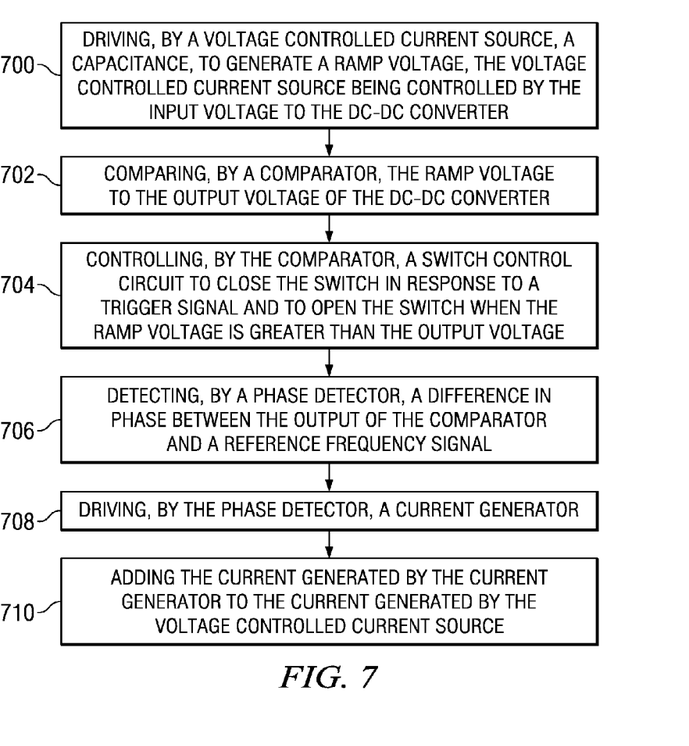
FIG. 7 is a flow chart illustrating an example embodiment of a method for controlling a DC-DC converter.

FIG. 7 illustrates an example method for controlling on-time and switching frequency of a switch in a DC-DC converter. Note, the arrangement of steps in the example method does not imply that steps must occur in any particular order, and some steps may take place simultaneously. At step 700, a voltage controlled current source drives a capacitance to generate a ramp voltage, the voltage controlled current source being controlled by the input voltage to the DC-DC converter. At step 702, a comparator compares the ramp voltage to the output voltage of the DC-DC converter. At step 704, the comparator controls a switch control circuit to close the switch in response to a trigger signal and to open the switch when the ramp voltage is greater than the output voltage. At step 706, a phase detector detects a difference in phase between the output of the comparator and a reference frequency signal. At step 708, the phase detector drives a current generator. At step 710, the current generated by the current generator is added to the current generated by the voltage controlled current source.

What is claimed is:

1. A method of controlling on-time and switching frequency of a switch in a DC-DC converter, the DC-DC converter having an input voltage and an output voltage, the method comprising:

driving, by a voltage controlled current source, a capacitance, to generate a ramp voltage, the voltage controlled current source being controlled by the input voltage to the DC-DC converter;

comparing, by a comparator, the ramp voltage to the output voltage of the DC-DC converter;

controlling, by the comparator, a switch control circuit to close the switch in response to a trigger signal and to open the switch when the ramp voltage is greater than the output voltage;

detecting, by a phase detector, a difference in phase between an output of the comparator and a reference frequency signal;

driving, by the phase detector, a current generator; and, adding a current generated by the current generator to a current generated by the voltage controlled current source to adjust the ON time of a main electronic switch so that the frequency of the converter will be at a reference frequency controlled by a voltage loop and without direct control of the switching period.

* * * * *